US012638075B2

(12) United States Patent
De Laet et al.

(10) Patent No.: US 12,638,075 B2
(45) Date of Patent: May 26, 2026

(54) TRANSFER OF LUBRICANT INTO THE INTERIOR OF A HOLLOW SHAFT

(71) Applicants: ZF FRIEDRICHSHAFEN AG, Friedrichshafen (DE); ZF Wind Power Antwerpen N.V., Lommel (BE)

(72) Inventors: Wim De Laet, Antwerp (BE); Andy Maes, Sinaai (BE); Stijn Rottiers, Lokeren (BE); Quinten Gaethofs, Houthalen (BE); Koen Krieckemans, Noorderwijk (BE)

(73) Assignees: ZF FRIEDRICHSHAFEN AG, Friedrichshafen (DE); ZF WIND POWER ANTWERPEN N.V., Lommel (BE)

( * ) Notice: Subject to any disclaimer, the term of this patent is extended or adjusted under 35 U.S.C. 154(b) by 32 days.

(21) Appl. No.: 18/867,463

(22) PCT Filed: Apr. 19, 2023

(86) PCT No.: PCT/EP2023/060067
§ 371 (c)(1),
(2) Date: Nov. 20, 2024

(87) PCT Pub. No.: WO2023/227294
PCT Pub. Date: Nov. 30, 2023

(65) Prior Publication Data
US 2025/0198505 A1      Jun. 19, 2025

(30) Foreign Application Priority Data
May 24, 2022    (DE) ..................... 10 2022 205 151.3

(51) Int. Cl.
*F16H 57/04* (2010.01)

(52) U.S. Cl.
CPC ..... *F16H 57/0479* (2013.01); *F16H 57/0426* (2013.01)

(58) Field of Classification Search
CPC .............. F16H 57/0469; F16H 57/042; F16H 57/0424; F16H 57/043
See application file for complete search history.

(56) References Cited

U.S. PATENT DOCUMENTS

| | | | |
|---|---|---|---|
| 2,403,579 | A | 7/1946 | Carpenter |
| 4,658,665 | A | 4/1987 | Strinzel et al. |

(Continued)

FOREIGN PATENT DOCUMENTS

| | | |
|---|---|---|
| DE | 3209514 A1 | 9/1983 |
| DE | 102018219140 A1 | 5/2020 |

(Continued)

*Primary Examiner* — Derek D Knight
(74) *Attorney, Agent, or Firm* — LEYDIG, VOIT & MAYER, LTD.

(57) ABSTRACT

An arrangement, including a gearbox housing, a hollow shaft rotatably mounted in the gearbox housing, and a lubrication point located at least partially inside the hollow shaft. The gearbox housing has a ring which encloses a hollow space with an outer circumferential surface of the hollow shaft. The ring has one or more drill holes, each of which opens into the hollow space. The hollow shaft has one or more drill holes, each of which opens into an interior of the hollow shaft and into the hollow space.

8 Claims, 3 Drawing Sheets

(56)          References Cited

U.S. PATENT DOCUMENTS

| | | | |
|---|---|---|---|
| 7,458,728 B2 * | 12/2008 | Kitamura | F16C 33/6614 |
| | | | 384/468 |
| 10,337,602 B2 * | 7/2019 | Hepermann | F16H 57/0482 |
| 2009/0065306 A1 | 3/2009 | Kawamoto et al. | |
| 2010/0007151 A1 | 1/2010 | Ciszak et al. | |
| 2016/0265651 A1 | 9/2016 | Smook | |
| 2022/0003305 A1 * | 1/2022 | Rottiers | F16J 15/3232 |
| 2022/0010875 A1 | 1/2022 | De Laet et al. | |
| 2022/0260152 A1 | 8/2022 | Riess et al. | |

FOREIGN PATENT DOCUMENTS

| | | | | |
|---|---|---|---|---|
| DE | 102018220590 A1 * | 6/2020 | | F16H 57/0471 |
| DE | 102019209948 A1 | 1/2021 | | |
| DE | 102019212444 A1 | 2/2021 | | |
| EP | 1488139 B1 | 8/2006 | | |
| JP | 2021085518 A | 6/2021 | | |
| WO | WO 03078870 A1 | 9/2003 | | |
| WO | WO 2015067429 A1 | 5/2015 | | |

* cited by examiner

TRANSFER OF LUBRICANT INTO THE INTERIOR OF A HOLLOW SHAFT

CROSS REFERENCE TO RELATED APPLICATIONS

This application is a U.S. National Phase application under 35 U.S.C. § 371 of International Application No. PCT/EP2023/060067, filed on Apr. 19, 2023, and claims benefit to German Patent Application No. DE 10 2022 205 151.3, filed on May 24, 2022. The International Application was published in German on Nov. 30, 2023, as WO 2023/227294 A1 under PCT Article 21(2).

FIELD

The invention relates to an arrangement for transferring oil between a housing-fixed means and a lubrication point located inside a hollow shaft.

BACKGROUND

In this context, EP 1 488 139 B1 shows a planetary stage of a gearbox with a rotating planet carrier and a stationary ring gear. The output of the planetary stage is carried out by means of a sun. Planets and planetary bearings are mounted on planetary shafts that rotate together with the planet carrier. A stationary pump feeds oil through stationary oil lines and oil conditioning elements (i.e. cooler, filter, etc.). A circular ring, e.g. made of polyamide, has a U-shaped profile and is mounted on a back side of the planet carrier. This ring fits into a machined annular groove in the stationary housing. As the ring is fixed relative to the rotating planet carrier, it therefore rotates relative to the stationary housing. The combination of the U-shaped ring and the annular groove in the housing forms a channel through which oil can run through holes in a locking plate of the planet carrier into hollow spaces in the back side of the planetary shafts. From here, the oil moves through the holes in the planetary shafts to the planetary bearings. Because the U-shaped ring does not fit perfectly into the milled groove in the housing, there is a certain amount of oil leakage and pressure drop.

SUMMARY

In an embodiment, the present disclosure provides an arrangement, comprising a gearbox housing, a hollow shaft rotatably mounted in the gearbox housing, and a lubrication point located at least partially inside the hollow shaft. The gearbox housing has a ring which encloses a hollow space with an outer circumferential surface of the hollow shaft. The ring has one or more drill holes, each of which opens into the hollow space. The hollow shaft has one or more drill holes, each of which opens into an interior of the hollow shaft and into the hollow space.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
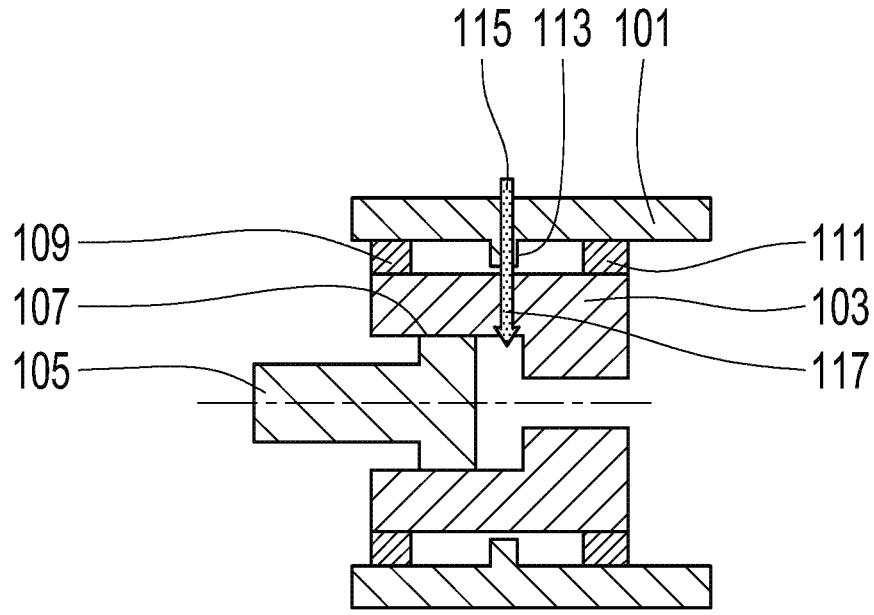
FIG. 1 illustrates an arrangement for supplying oil to a spline.

In an embodiment, the present invention provides for transferring oil between a housing-fixed means and a lubrication point located inside a hollow shaft.

The arrangement comprises the housing-fixed means, the hollow shaft and the lubrication point. The housing-fixed means is a means that is fixed, i.e. arranged in a housing without the possibility of a relative movement. In particular, the housing itself is a housing-fixed means.

The hollow shaft is rotatably mounted in the housing-fixed means. It is therefore rotatable relative to the housing-fixed means. The mounting is provided by one or more bearings that support the hollow shaft in the housing-fixed means. In particular, an outer ring of each of the bearings can be fixed in the housing-fixed means, while an inner ring is fixed on the hollow shaft.

A hollow shaft is characterized in that it is hollow on the inside, i.e. it encloses a hollow space. This hollow space is referred to as the interior of the hollow shaft.

In particular, the hollow shaft can be configured as the output shaft of the gearbox and/or be connected or connectable to a rotor of a generator in a rotationally fixed manner. Preferably, the hollow shaft is rotationally symmetrical with respect to its axis of rotation. This means that its interior is also rotationally symmetrical with respect to the axis of rotation.

Preferably, the interior of the hollow shaft opens into the two end faces of the hollow shaft. This means that the two end faces each have an opening through which the interior is accessible from the outside.

A lubrication point refers to a means with lubrication requirements. To prevent wear, lubricant must be added to the means.

The arrangement according to the present disclosure is preferably part of a gearbox. This implies that the housing-fixed means, the hollow shaft and the lubrication point are also part of the gearbox. Preferably, it is a wind turbine gearbox.

According to the present disclosure, the housing-fixed means has a ring. The ring can be connected to the housing-fixed means as one or more pieces.

A ring is a body that has the shape of a toroid. This is a surface of rotation with a continuous recess through which the axis of rotation runs.

The ring encloses the hollow shaft so that the hollow shaft extends through the recess in the ring and part of the hollow shaft is located in the recess.

The ring encloses a hollow space together with an outer circumferential surface of the hollow shaft. Preferably, the hollow space is rotationally symmetrical to an axis of rotation of the hollow shaft and the above-mentioned axis of rotation of the ring.

The ring has one or more drill holes, each of which opens into the hollow space. Drill holes are generally referred to here as through holes. A through hole is a hole with exactly two openings. In particular, it can be a cylindrical hole that has been created by drilling, for example.

Also, the hollow shaft has one or more drill holes. These open into the inside of the hollow shaft and into the hollow space. As a result, the drill holes of the hollow shaft connect the interior of the hollow shaft and the hollow space with each other in an oil-conducting manner.

The drill holes of the ring and the hollow shaft serve as lubricant lines. As they open into the hollow space, the hollow space forms a lubricant-conducting connection between the ring and the hollow shaft and/or between their drill holes. Lubricant can be fed into the hollow space via the drill-holes of the ring. The lubricant passes from the hollow space via the drill holes of the hollow shaft into the interior of the hollow shaft. In this way, the lubrication point inside the hollow shaft is supplied with oil.

Embodiments of the present invention are advantageous because they can be realized without significant design changes to a conventional arrangement with a housing-fixed means, a hollow shaft rotatably mounted in the housing-fixed means and a lubrication point located inside the hollow shaft. Only the drill holes and the ring are required to supply the lubrication point with oil. Both the drill holes and the ring are comparatively simple and inexpensive to manufacture.

The arrangement is preferably further configured with a shaft and a spline. A spline is a multiple-driver connection consisting of two toothings. The toothings mesh with each other in such a way that they are connected in a rotationally fixed manner. Their center and/or rotation axes coincide.

The shaft and the hollow shaft are connected to each other via the spline in a rotationally fixed manner. Specifically, one toothing of the spline is connected to the shaft in a rotationally fixed manner. The other toothing of the spline is connected to the hollow shaft in a rotationally fixed manner. In particular, the shaft and/or the hollow shaft can form the respective toothing of the spline as one piece.

In a further embodiment, the spline forms the above-mentioned lubrication point. The further embodiment makes it possible to supply the spline with lubricant even though it is located at least partially inside the hollow shaft and is therefore difficult to access.

The arrangement can also be further configured with a feed-through tube and at least one bearing. A feed-through tube, also known as a pitch tube, is a tube for feeding through supply lines, such as electrical cables and/or lubricant lines.

The feed-through tube is mounted in the hollow shaft with the at least one bearing. This allows the hollow shaft to be rotatable relative to the feed-through tube. In particular, the feed-through tube can be arranged in a housing-fixed manner so that no relative movements are possible between the feed-through tube and the housing.

The bearing forms the lubrication point according to the further embodiment. The further embodiment makes it possible to supply the bearing with oil even though it is located at least partially inside the hollow shaft and is therefore difficult to access.

In a preferred embodiment, the ring does not touch the outer circumferential surface of the hollow shaft. Preferably, one or more gaps run between the ring and the outer circumferential surface of the hollow shaft. These can be configured to be flat or further configured as labyrinth seals.

The further embodiment results in an oil leak between the ring and the outer circumferential surface of the hollow shaft, the size of which depends on the configuration of the gaps. The oil leak is accepted in favor of freedom from wear.

Preferably, the arrangement is further configured with at least two bearing arrangements. With these, the hollow shaft is rotatably mounted in the housing-fixed component. The hollow space is arranged axially between the bearing arrangements. This is advantageous as the bearing arrangements are lubricated via the above-mentioned oil leak.

The hollow shaft is preferably further configured with at least one hydrodynamically effective means. This is a movable means that is configured to build up a hydrodynamic pressure. The hydrodynamic pressure is created by a hydrodynamic effect due to the movement of the means. In the present case, the means moves due to a rotation of the hollow shaft. Preferably, the means is connected to the hollow shaft in a rotationally fixed manner. In particular, the hollow shaft can form the means as one piece.

In a further embodiment, when the hollow shaft rotates, the means builds up a hydrodynamic pressure that acts on at least one opening of the drill holes of the hollow shaft. As a result, the hydrodynamic pressure causes the oil to be conveyed through the drill holes of the hollow shaft from the hollow space into the interior of the hollow shaft.

The means is preferably configured as a recess and/or pocket. This is preferably located in front of the at least one opening in the rotation direction of the shaft. Preferably, there is also an elevation and/or shoulder behind the at least one opening in the rotation direction of the shaft.

Preferred embodiments of the invention are shown in the figures. Corresponding reference numerals indicate identical or functionally identical features.

The arrangement shown in FIG. 1 comprises a part of a gearbox housing 101, a hollow shaft 103 and a sun shaft 105.

The hollow shaft 103 and the sun shaft 105 each form part of a spline 107. The hollow shaft 103 and the sun shaft 105 are connected to each other in a rotationally fixed manner by means of the spline 107. The spline 107 is located inside the hollow shaft 103. Accordingly, the hollow shaft 103 forms an internal toothing associated with the spline 107, the sun shaft 105 forms an external toothing associated with the spline 107. The internal gearing and the external gearing mesh with each other and are thus connected to each other in a rotationally fixed manner.

The hollow shaft 103 is rotatably mounted in the gearbox housing 101 via a first bearing 109 and a second bearing 111.

A lubricant transfer ring 113 is located axially between the first bearing 109 and the second bearing 111. This ring is part of the gearbox housing 101. A lubricant line 115 passes through the wall of the gearbox housing 101 and the lubricant transfer ring 113.

A further lubricant line 117 is formed by the hollow shaft 103. The lubricant line 117 connects an outer circumferential surface of the hollow shaft 103 to a hollow space in the interior of the hollow shaft 103 in a lubricant-conducting manner.

In order to supply the spline 107 with lubricant, the lubricant is fed into the lubricant line 115 of the gearbox housing 101. At the lubricant transfer ring 113, the lubricant passes into the lubricant line 117 of the hollow shaft 103. The lubricant line 117 feeds the lubricant into the hollow space formed by the hollow shaft.

Figure 2:
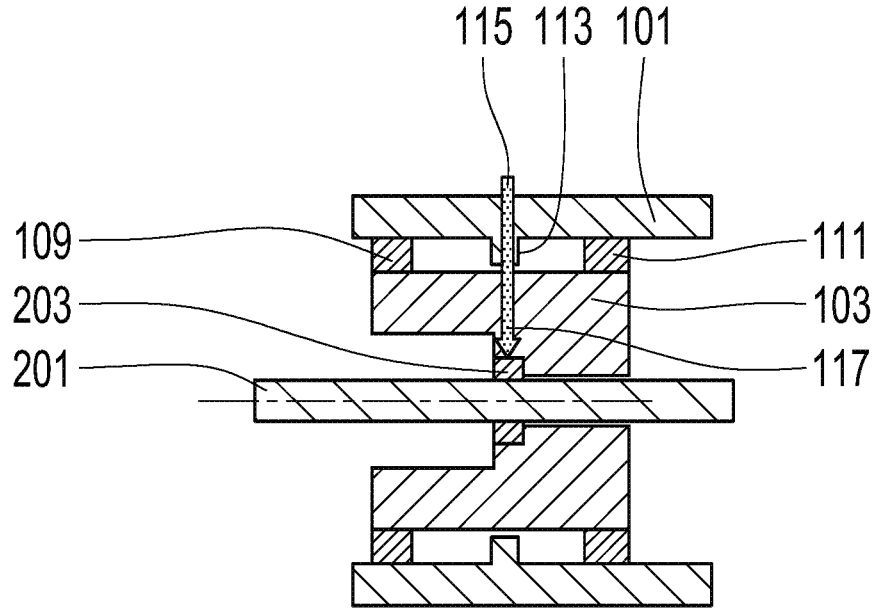
FIG. 2 illustrates an arrangement for supplying oil to a bearing of a feed-through tube.

The arrangement shown in FIG. 2 differs from the arrangement in FIG. 1 in that it has a feed-through tube 201 and a third bearing 203 instead of the sun shaft 105 and the spline 107. The feed-through tube 201 is rotatably mounted in the hollow shaft 103 by means of the third bearing 203. Thereby the third bearing 203 is located in the hollow space formed by the hollow shaft 103. It is therefore supplied with lubricant via the lubricant lines 115, 117 and the lubricant transfer ring 113 analogously to the spline 107.

Figure 3:
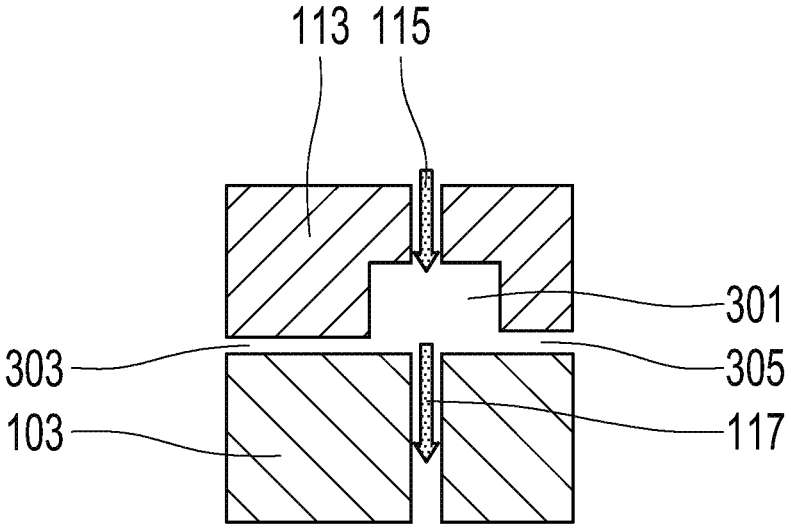
FIG. 3 illustrates the structure of a lubricant transfer ring.

FIG. 3 illustrates the structure of the lubricant transfer ring 113. The lubricant transfer ring 113 is provided with a groove 301. This is open radially inwards in the direction of an axis of rotation of the hollow shaft 103. Together with an outer circumferential surface of the hollow shaft 103, the groove 301 encloses a hollow space. This is used for the transfer of lubricant from the lubricant line 115 of the gearbox housing 101 into the lubricant line 117 of the hollow shaft 103.

A first gap 303 and a second gap 305 extend on both sides of the groove 301 between the lubricant transfer ring 113 and the hollow shaft 103. Lubricant escapes through the first gap 303 and the second gap 305 from the hollow space formed by the groove 301 and the outer circumferential surface of the hollow shaft 103. There is therefore no solid state friction between the lubricant transfer ring 113 and the hollow shaft 103. Accordingly, no wear occurs.

Figure 4:
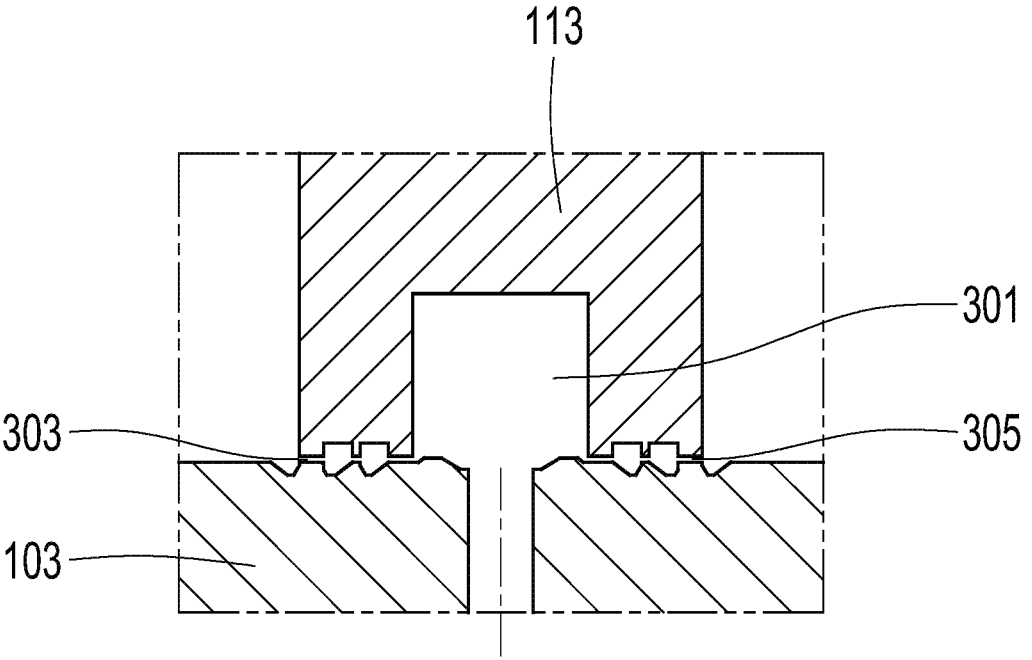
FIG. 4 the structure of the lubricant transfer ring a detailed view with a labyrinth seal.

In order to minimize leakage due to escaping lubricant, the first gap 303 and the second gap 305 can be configured as labyrinth seals, as shown in FIG. 4.

Figure 5:
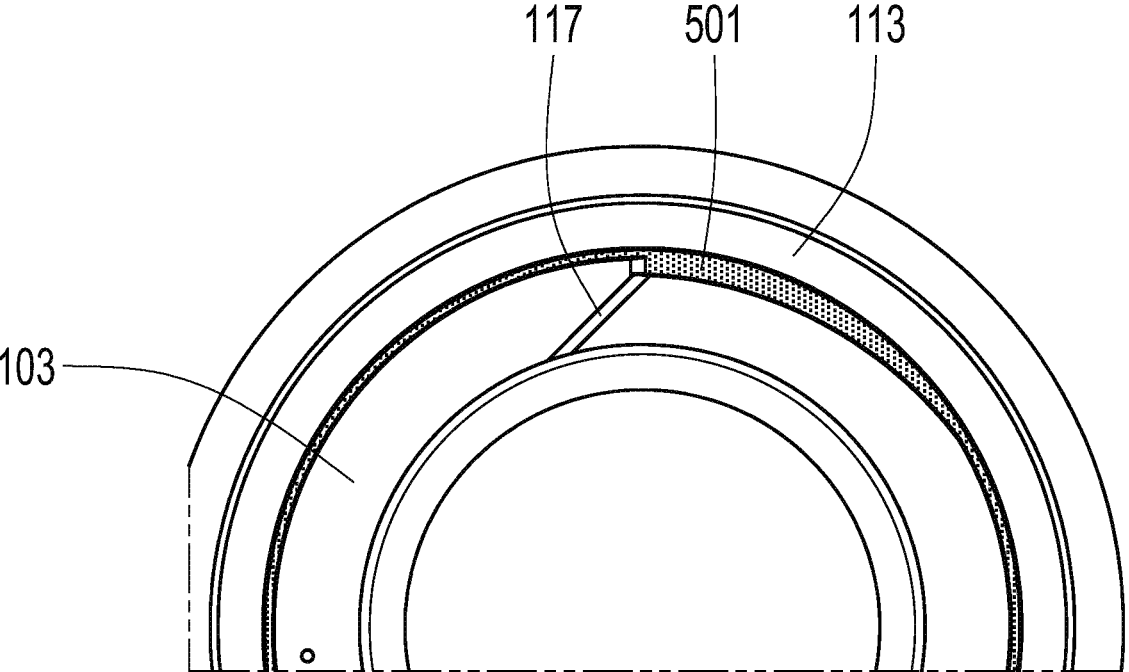
FIG. 5 illustrates a hydrodynamically effective pocket.

In the sectional view of FIG. 5, it can be seen that the hollow shaft 103 has a pocket 501. The depth of the pocket 501 increases continuously towards the lubricant line 117. This results in a hydrodynamic effect with an increase in the lubricant pressure at the opening of the lubricant line 117 during a rotation of the hollow shaft 103. The increased lubricant pressure leads to a pumping effect that conveys lubricant through the lubricant line 117 into the interior of the hollow shaft 113.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

REFERENCE NUMERALS

101 gearbox housing
103 hollow shaft
105 sun shaft
107 spline
109 first bearing

111 second bearing
113 lubricant transfer ring
115 lubricant line
117 lubricant line
201 feed-through tube
203 third bearing
301 groove
303 first gap
305 second gap
501 pocket

The invention claimed is:

1. An arrangement, comprising:
a gearbox housing;
a hollow shaft rotatably mounted in the gearbox housing; and
a lubrication point located at least partially inside the hollow shaft,
wherein:
the gearbox housing has a ring which encloses a hollow space with an outer circumferential surface of the hollow shaft,
the ring has one or more drill holes, each of which opens into the hollow space, and
the hollow shaft has one or more drill holes, each of which opens into an interior of the hollow shaft and into the hollow space.

2. The arrangement according to claim 1, comprising:
a shaft; and
a spline, wherein
the shaft and the hollow shaft are connected to each other by the spline in a rotationally fixed manner, and
wherein the spline forms the lubrication point.

3. The arrangement according to claim 1, comprising:
a feed-through tube; and
at least one bearing with which the feed-through tube is mounted in the hollow shaft,
wherein the bearing forms the lubrication point.

4. The arrangement according to claim 1, wherein the ring does not touch the outer circumferential surface.

5. The arrangement according to claim 4, comprising one or more labyrinth seals that seal the ring relative to the outer circumferential surface.

6. The arrangement according to claim 1, comprising at least two bearing arrangements with which the hollow shaft is rotatably mounted in the gearbox housing, wherein hollow space is arranged axially between the at least two bearing arrangements.

7. The arrangement according to claim 1, wherein the hollow shaft and/or the ring has at least one pocket that is configured to build up a hydrodynamic pressure acting on at least one opening of the drill holes of the hollow shaft during a rotation of the hollow shaft.

8. An arrangement, comprising:
a gearbox housing;
a hollow shaft rotatably mounted in the gearbox housing; and
a lubrication point located at least partially inside the hollow shaft,
wherein:
the gearbox housing has a ring which encloses a hollow space with an outer circumferential surface of the hollow shaft,
one or more labyrinth seals seal the ring relative to the outer circumferential surface,
the ring has one or more drill holes, each of which opens into the hollow space, and the hollow shaft has one or more drill holes, each of which opens into an interior of the hollow shaft and into the hollow space.

* * * * *